United States Patent [19]

Wada et al.

[11] Patent Number: 5,154,771
[45] Date of Patent: Oct. 13, 1992

[54] HYDRAULIC INORGANIC COMPOSITION AND MOLDED ARTICLES THEREOF

[75] Inventors: Takeo Wada, Kawanishi; Kazumi Matsuura, Itami; Mitsuo Kato, Ryugasaki; Hideaki Matsuda, Nishinomiya, all of Japan

[73] Assignee: Takeda Chemical Industries, Ltd., Osaka, Japan

[21] Appl. No.: 553,816

[22] Filed: Jul. 19, 1990

[30] Foreign Application Priority Data

Jul. 19, 1989 [JP] Japan ................. 1-188280
Mar. 9, 1990 [JP] Japan ................. 2-59421

[51] Int. Cl.$^5$ ............................. C04B 25/10
[52] U.S. Cl. ..................... 106/730; 106/617; 106/674; 106/687; 106/708; 106/779; 106/790; 106/804; 106/823; 264/333
[58] Field of Search ........... 106/730, 804, 617, 674, 106/687, 696, 708, 779, 790, 795, 823; 264/333

[56] References Cited

U.S. PATENT DOCUMENTS

| | | |
|---|---|---|
| 3,754,925 | 8/1973 | Kimura et al. |
| 4,073,658 | 2/1978 | Ohtani et al. ............. 106/730 |
| 4,210,456 | 7/1980 | Miller ..................... 106/804 |
| 4,462,836 | 7/1984 | Baker et al. ............. 106/730 |
| 4,573,534 | 3/1986 | Baker et al. ............. 106/730 |
| 4,687,516 | 8/1987 | Burkhalter et al. ...... 106/719 |

FOREIGN PATENT DOCUMENTS

| | | |
|---|---|---|
| 0290198 | 11/1988 | European Pat. Off. |
| 0296932 | 12/1988 | European Pat. Off. |
| 0297942 | 1/1989 | European Pat. Off. |
| 0432770 | 6/1991 | European Pat. Off. |
| 52-47821 | 4/1977 | Japan. |
| 59-227752 | 12/1984 | Japan. |
| 60-21838 | 2/1985 | Japan. |
| 62-292662 | 12/1987 | Japan. |
| 64-51359 | 2/1989 | Japan. |
| 1-103941 | 4/1989 | Japan. |

OTHER PUBLICATIONS

Tokuya Harada et al., "Production of a New Acidic Polysaccharide, Succinoglucan by *Alcaligenes faecalis* var. myxogenes", Agri. Biol. Chem., vol. 29, No. 8 (1965), pp. 757-762.

Akinori Amemura, "Synthesis of (1-2)-$\beta$-D-Glucan by Cell-free Extracts of *Agrobacterium radiobacter* IFO 12665b1 and *Rhizobium phaseoli* AHU 1133", Agri. Biol. Chem., vol. 48, No. 7 (1984), pp. 1809-1817.

Chemical Abstracts, vol. 105, No. 10, Abstract No. 84229d, Yabu et al.

Primary Examiner—Mark L. Bell
Assistant Examiner—Anthony J. Green
Attorney, Agent, or Firm—Wegner, Cantor, Mueller & Player

[57] ABSTRACT

A hydraulic inorganic compositions which comprises a hydraulic inorganic powder at least one of polysaccharides selected from the group consisting of $\beta$-1,3-glucans, pullulan and XCD-Polymer in an amount of 0.1-10 parts by weight in relation to 100 parts by weight of the hydraulic inorganic powder, and water in an effective amount.

The composition preferably further contains a reinforcing fiber, a filler, in particular mountain leather, a coagulant and/or a second molding aid, in particular, methyl cellulose.

The composition is hardened by hydration under normal pressure to provide a hardened molded article such as a cement board.

15 Claims, No Drawings

HYDRAULIC INORGANIC COMPOSITION AND MOLDED ARTICLES THEREOF

This invention relates to a hydraulic inorganic composition and molded articles thereof. More particularly the invention relates to a hydraulic inorganic composition which is plastic and moldable in the presence of a small amount of water and which readily sets and hardens by hydration under normal pressure, thereby to provide molded articles for use as, for example, civil engineering and building materials, heat insulation materials, medical materials or industrial pipes.

There are known a number of boards used as buiding materials. For example, in the production of asbestos slate boards, portland cement is used as a binder and asbstos fibers are used as a reinforcement and a plasticizing agent as well. Calcium silicate and slag gypsum boards are also used as building materials. These various boards have hitherto been produced by forming a sheet by a paper making method using a large amount of water and then by allowing the sheet to harden by hydration. However, the use of asbestos fibers have been controlled in recent years on account of possible damage to environments not only where such boards are produced, but also where such boards are used. Moreover, the above mentioned production method of asbestos boards also has a problem of waste water treatment since the method needs a large amount of water.

Therefore, avoiding the use of asbestos fibers and conversion to extrusion molding process have been strongly demanded in the production of hydrauric inorganic molded articles. There has been proposed a method wherein a hydraulic inorganic powder is first kneaded together with pulp fibers or a fine ground inorganic powder such as of diatomaceous earth or zeolite in the presence of water to provide a paste, the paste is molded into a green mold, and then the green mold is cured to a hardened material, as disclosed in Japanese Patent Laid-Open Nos. 51359/1989 or 103941/1989. However, the use of pulp fibers as a reinforcement in place of asbestos fibers fails to provide a molded article with sufficient strength.

A variety of method have been proposed in which synthetic fibers are used as a reinforcement in place of asbestos fibers. However, since a hydraulic inorganic powder has substantially no plasticity, it is difficult to provide the powder with a sufficient plasticity by using synthetic fibers as a reinforcement. In addition, synthetic fibers are poorly dispersible in a wet paste of hydraulic inorganic powders including cement so that a wet paste of cement and synthetic fibers has an insufficient moldability or rollability, with the consequence that such a paste fails to provide a hardened product of such a strength and durability for practical use.

Meanwhile, there are already known a number of cement admixtures or additives which improve specific properties of hydraulic compositions or cement products. Some of such additives are in practical use. For instance, some of oligosacharides or polysaccharides are used as a water reducing agent or an agent for suppressing temperature increase in hydration of cement compositions.

For example, a cement additive containing oligosaccarides, polysaccharides or natural origin water-soluble gums is disclosed in Japanese Patent Laid-open Nos. 227752/1984 and 292662/1987. A cement additive which contains gum arabic is known in Japanese Patent Laid-open No. 21838/1985.

There is further disclosed welan gum as being useful as a viscosifier and a suspending agent in an aqueous brine in U.S. Pat. No. 4,342,866. It is already known that welan gum is incorporated in a cement composition to improve workability, suspension of aggregates, air entrainment and resistance to water loss among others, as set forth in Europian Patent Application No. 0 290 198.

The present inventors have made extensive investigations to solve the problems involved in the prior art production of molded articles of hydraulic inorganic powders, and to obtain a hydraulic composition which is readily molded, and found that the addition of specific natural origin polysaccharides as a plasticizing agent or a molding aid together with a small amount of water to a hydraulic inorganic powder provides an aqueous composition or a wet paste having a high plasticity or moldability. The inventors have further found that a molded article of such a composition sets and hardens under normal pressure by hydration with the water contained in the composition, free from a problem of waste water discharge.

In accordance with the invention, there is provided a hydraulic inorganic composition which comprises a hydraulic inorganic powder, at least one polysaccharide selected from the group consisting of $\beta$-1,3-glucans, pullulan and XCD-Polymer (tradename of Ternite Co., Ltd., Japan) in an amount of 0.1–10 parts by weight in relation to 100 parts by weight of the hydraulic inorganic powder, and water in an effective amount.

The hydraulic inorganic powder per se has substantially no plasiticity, however, the powder, when kneaded with a small amount of the polysaccharide as above mentioned and water, provides an aqueous composition which has high a plasiticity or moldability as potter's clay. Therefore, such a composition is, for example, extrusion-molded, and is then allowed to harden at normal pressure, whereby to provide a hardened article with high strength.

As an important feature of the invention, the water used for the production of the composition is utilized for hydration of the hydraulic powder, so that no problem of waste water discharge is attended, and a closed system of water is achieved. Moreover, there is no need of a large amount of water for the production of the composition.

The hydraulic inorganic powder used in the invention includes, for example, cement, lime, gypsum, calcium silicate, calcium carbonate, magnesium carbonate and magnesium trisilicate among others. The cement is exemplified by portland cement which includes silica, diatomaceous earth, blast furnace slag and fly ash, limes or gypsum. In the field of production of boards for use as building materials, the use of portland cement as a hydraulic inorganic powder provides cement slate boards. The use of a composition mainly composed of calcium silicate as a hydraulic inorganic powder together with silica, diatomaceous earth and lime among others provides calcium silicate boards. The use of slag, gypsum or lime provides slag gypsum boards. Other hydraulic inorganic powders may be used, thereby to provide, for example, gypsum boards, magnesium carbonate boards or calcium carbonate boards.

The composition of the invention is not specifically limited in shape of molded articles which the composition provides, and the composition may be applied to rod or tubular articles in addition to such board articles as above described.

The composition of the invention contains at least one polysaccharide selected from the group consisting of β-1,3-glucans, pullulan and XCD-Polymer (tradename of Ternite Co., Ltd., Japan) as a plasticizing agent or a molding aid. The β-1,3-glucan is such a polysaccharide which is mainly composed of β-1,3-glucoside linkages, and includes, for example, curdlan, laminarin and paramylon, among which curdlan is most preferred.

Curdlan is usually curdled or coagulated when heated in the presence of water, i.e., which property being herein referred to as "thermocurdling", or forms a gel when heated in the presence of water, as described, for example, in New Food Industry, Vol. 20, No. 10, pp. 49-57 (1978).

Curdlan may be produced by Alcaligenes or Agrobacterium microorganisms, more specifically, by *Alcaligenes faecalis var myxogenes* 10C3K (Agricultural Biological Chemistry, Vol. 30, p. 196 (1966)), a mutant NTK-u (IFO 13140) of the above (Japanese Patent Publication no 48-32673), *Agrobacterium radiobacter* (IFO 13127) or its mutant (IFO 12126) (Japanese Patent Publication no 48-32674).

Curdlan is a microbial polysaccharide as above, and it may be used as impure or highly purified, the same as the other polysaccharides.

Paramylon is also one of natural orgin β-1,3-glucans, and from the standpoint of origin, it is a reserve polysaccharide which a microbe Euglena reserves in cells. Paramylon is already known as described in Carbohydrate Research, 25, 231-242 (1979) or Japanese Patent Laid-open No. 37297/1989. However, paramylon is not thermocurdling, contrary to curdlan. Thus, paramylon may be treated with an alkali so that it is thermocurdling, if desired. Paramylon may be used in an impure or highly purified state.

Pullulan is a glucan which is mainly composed of α-1,4- and α-1,6-glucoside linkages.

XCD-Polymer is a tradename of a water soluble, microbial origin polysaccharide available from Ternite Co., Ltd., Japan, and is known as a thickner. It is a bacterial origin polysaccharide of a high molecular weight.

β-1,3-glucans which form crosslinked gels in the presence of metal ions of two or more valencies, such as calcium, magnesium, iron, cobalt or copper, may be obtained by specific treatment of microbial polysaccharides, preferably, curdlan or paramylon. More specifically, such a crosslinked gel-forming polysaccharide may be obtained by dissolving a microbial β-1,3-glucan in an alkaline solution, putting the solution into contact with a water soluble organic solvent to deposit the glucan, and then neutralizing the glucan preferably to a pH of 6-7.

The crosslinked gel-forming polysaccharide may also be obtained by freezing the alkaline solution, thawing the frozen solution by putting it into contact with a water soluble organic solvent to deposit the glucan, and then neutralizing the glucan. The thus obtained glucan may be dehydrated and dried to powder, if desirable. An alcohol such as methanol is preferably used to deposit the glucan, while an aqueous solution of sodium hydroxide, potassium hydroxide or ammonium hydroxide is preferably used to dissolve the glucan therein in the above methods. The neutralization may be carried out usually with a mineral acid such as hydrochloric acid.

The thus obtained β-1,3-glucan forms crosslinked gels in the presence of metal ions, so that it is advantageously used as a molding aid in the composition of the invention.

The composition of the invention contains at least one of the polysaccharide as hereinbefore mentioned usually in an amount of about 0.1-10 parts by weight, preferably in an amount of about 0.5-5 parts by weight, in relation to 100 parts by weight of the hydraulic powder used. The hydraulic powder, when being kneaded with such a polysaccharide, provides an aqueous plastic composition, and the composition is molded and hydrated to provide hardened articles with high strength.

In accordance with the invention, the use of the polysaccharide as set out before is essential to provide a hydraulic powder with plasticity. However, the co-use of the polysaccharide as a first molding aid and a second molding aid may be employed so that the resultant composition has a higher moldability and produces molded bodies with higher mechanical strength.

The second molding aid includes, for example, cellulosic compounds, polyhydric compounds and polyvinyl compounds.

More specifically, the cellulosic compound includes methyl cellulose, ethyl cellulose, carboxymethyl cellulose, sodium carboxymethyl cellulose, hydroxyethyl cellulose, hydroxypropyl cellulose, hydroxypropyl methyl cellulose and hydroxyethyl methyl cellulose. The polyhydric compound used includes, for example, glycerine; alkylene glycols such as ethylene glycol, propylene glycol or 1,3-butylene glycol; and polyalkylene glycols such as polyethylene glycol or polypropylene glycol. A variety of polyvinyl compounds may be useful as the second molding aid, and there may be used, for instance, polyvinyl alcohol, polyvinyl pyrrolidone, polyacrylic acid resins, polyacrylic acid salt resins, e.g., polyammnoum acrylate, acrylic acid-maleic acid copolymers, or their ammonium salts. The polyacrylic acid resin may be cross-linked.

A variety of compounds are usable as the second molding aid in addition to the above, and for example, carboxymethyl starch, polyvinyl alcohol, polyvinyl acetate emulsion or styrene-butadiene rubber latex may be mentioned. It is particularly useful to use an emulsion binder in the production of calcium silicate boards to improve processability of the board.

The second molding aid may be used singly or as a mixture of two or more, and may be contained in an amount usually of about 0.1-10 parts by weight, preferably in an amount of about 0.5-5 parts by weight, in relation to 100 parts by weight of hydraulic powder used.

A coagulant or a lubricant may be used in the preparation of a kneaded paste, when desired. The coagulant may be inorganic such as polyaluminum chloride, ferrous sulfate, ferrous chloride, ferric chloride, alum, sodium aluminate or polyaluminum sulfate, or a medium or high polymerization degree organic coagulant such as sodium polyacrylate, its partial hydrolysate, polyacrylamide partial hydrolysate, acrylamide-sodium acrylate copolymer, polyvinylimidazoline, polyalkylaminoacrylate, polyalkylaminomethacrylate, modified Mannich product of polyacrylamide, polyacrylamide or polyethylene oxide. Hibiscus root may also be used as an effective coagulant. The coagulant may be used in an amount of 0.1-10% by weight based on dry amount of the paste.

Further, a wetting agent or surfactant such as polyethylene glycol alkyl ethers or a water repelling agent such as zinc stearate, aluminum stearate or magnesium stearate may also be incorporated into the paste.

The hydraulic inorganic composition of the invention preferably contains reinforcing fibers. The reinforcing fibers include, for example, synthetic organic fibers such as polyvinyl alcohol fibers, polyacrylonitrile fibers, polyamide fibers, polyester fibers, polyethylene fibers, polypropylene fibers, polyvinylidene chloride fibers, polyvinyl chloride fibers or polytetrafluoroethylene fibers; natural fibers such as cotton, hemp, hemp palm, paper bush, wood pulp or waste paper pulp; inorganic fibers such as carbon fibers or glass fibers including alkali resistant glass fibers; and mineral fibers such as hormite or wollastonite.

Among these reinforcing fibers, polyvinyl alcohol fibers or polyacrylonitrile fibers are particularly preferred, and the former is most preferred on account of its high compatibility with the paste and high strength. The reinforcing fibers preferably have a length of about 0.1-20 cm and a diameter of about 1 micron to 0.2 mm. The fibers may be used singly or as a mixture. For instance, the co-use of hormite and synthetic fibers makes the latter more compatible with the paste.

An inorganic filler may be further contained in the composition of the invention. The filler used may include light-weight aggregates such as pearlite, "shirasu balloon" (microporous aggregates produced by calcining volcanic sand yielded at Kagoshima, Japan) or "microballoon", expanded vermiculite, or refractory materials such as sand, barytes, mica, clay, brick powder, baddeleyite or zircon flower. Mountain leather is also useful as a filler.

Mountain leather is a clay mineral which has a number of active hydroxyls on the surface, and is called also mountain cork or mountain wood. It may be exemplified by sepiolite (hydrous magnesium silicate), or attapulgite or palygorskite (hydrous magnesium aluminum silicate). Meerschaum is also one of what is called mountain leather.

Mountain leather is usually fibrous or powder in appearance. It may be used as it is, but preferably it is used as a porous material so that it is more compatible with fiber reinforcements. For example, the application of a large shearing force upon wetted mountain leather makes the mountain leather porous.

The reinforcing fibers and fillers may be used in a total amount of not more than about 40%, preferably in an amount of not more than about 30%, by weight based on the hydraulic inorganic powder. In particular, it is preferred that the reinforcing fibers are used in an amount of not more than about 15%, most preferably in an amount of about 3-10%, by weight based on the hydraulic inorganic powder.

The amount of water in the composition of the invention depends upon the hydraulic inorganic powder used as well as the reinforcing fibers and fillers used and their amounts, so that it can not be determined specifically. However, the amount of water is readily determined experimentally so that the resultant paste has an optimum plasticity for molding. By way of example, when portland cement is used as a hydraulic powder, water is used in an amount of about 20-50 parts by weight in relation to 100 parts by weight of the cement.

The aqueous hydraulic inorganic composition of the invention may be produced by any conventional manner and is then molded into a green mold by any known means such as extruders, rolls, doctor blades, potter's wheels, centrifugal molding machines or suction molding machines.

The green mold is allowed to harden by hydration under normal pressure. The water used to prepare the paste is utilized for hydration and hardening, however, an additional amount of water may be sprayed onto the paste or the paste may be exposed to steam, if necessary, to provide the green mold with an additional amount of water.

The hydration temperature depends upon the hydraulic inorganic powder used, and it may range from freezing point to about 180° C. When a cement is used as a hydraulic powder, the paste is hydrated at temperatures of about 0°-180° C. Thus, natural or steam aging is employed. Meanwhile, when gypsum is used, the paste is hydrated preferably at temperatures of about 10°-80° C.

The invention will now be described in more detail with reference to examples, however, the invention is not limited thereto.

The materials used in the examples are as follows.
Cement:
Normal portland cement.
Polysaccharide:
Curdlan from Takeda Chemical Industries, Ltd.
Pullulan, PF-20 from Hayashihara Seibutsu Kenkyusho
XCD Polymer from Ternite Co., Ltd.
Reinforcing fibers:
Polyvinyl alcohol fibers, 1.6 d, 5 mm in length, from Unitica Kasei K.K.
Mountain leather:
Sepiolite: Aidplus PMC from Takeda Chemical Industries, Ltd.
Attapulgite: Minu-Gel 100 from Floridein, U.S.A.
Molding aid:
Methyl cellulose: Metrose SM-4000 from Shinetsu Kagaku Kogyo K. K.
Coagulant:
Polyethylene oxide; Alcox E-100 from Meisei Kagaku K. K.

EXAMPLE 1

An amount of 150 g of sepiolite, 30 g of curdlan, 60 g of methyl cellulose, 2400 g of cement, 600 g of 40-60 mesh pit sand and 60 g of reinforcing fibers were mixed together with a V-type mixer over a period of 30 minutes to provide a powder mixture.

An amount of 500 g of hibiscus root was beaten with a mallet, and 15 liters of water were added thereto, followed by standing for one day, to provide viscous water.

The above mentioned powder mixture was placed in a kneader, then 982 ml of the hibiscus water were added thereto gradually, and the mixture was kneaded over about 10 minutes to provide about 14 Kg of clay-like paste which was found not to adhere to the to hands. It was possible to hand-knead the paste as if clay, showing that the paste had a high plasticity.

The paste was hand-kneaded for about five minutes, and was then molded into a vessel having a height of 40 cm, an outer diameter of 30 cm with a side wall 0.8 cm thick and a bottom 1.2 cm thick. The green mold semi-coagulated after half a day. An opening of a diameter of about 8 cm was formed through the side wall, and the mold was wrapped with a resin sheet. Steam of a temperature of 180° C. was blown into the vessel through the opening over about three hours to steam-age the mold. The outer diameter shrinkage of the hardened mold after the aging was found to be about 8 mm.

EXAMPLE 2

An amount of 25 g of sepiolite, 10 g of reinforcing fibers, 5 g of curdlan, 10 g of methyl cellulose, 5 g of polyethylene oxide, 400 g of normal portland cement and 156 g of water were kneaded together over a period of about 20 minutes with a kneader. The resultant paste was found to contain fibers in the form of filaments.

The paste was extruded through a die provided with three openings of 3 mm in diameter to provide three strings each of 4 m in length without being broken. The first string was wound around a hard paper tube of 8.3 cm in diameter with both ends attached to the tube; the second string was wound with the ends free around a tissue paper tube of 8.3 cm in diameter; and the third string was wound into a "doughnut". All the strings semi-coagulated after half a day.

A string of 5 cm in length was cut out from the third string, and was cut open axially. The fibers were found to be oriented along the lengthwise direction of the string. Meantime, the first and second strings were naturally cured over a period of 28 days. No crack was found on the first string whereas the second was found to shrink to a diameter of 8.25 cm. Neither string was found to have bubbles or fibers exposed to the surface under a microscope.

The third string had a weight of 192 g immediately after the extrusion, but it had a weight of 164 g after the 28 day natural curing.

EXAMPLE 3

An amount of 88 parts by weight of calcined gypsum, 5 parts by weight of sepiolite, 3 parts by weight of reinforcing fibers, 1 part by weight of curdlan, 2 parts by weight of methyl cellulose and 1 part by weight of polyethylene oxide were admixed together with a ribbon blender to provide a powder mixture.

The powder mixture was kneaded with 77 parts by weight of water over about 10 minutes with a screw kneader to provide a clay-water mixture like paste.

The paste was supplied between a pair of rolls having a clearance of 6 mm therebetween and rotating at different rates, to provide a sheet of 6 mm thick on the roll rotating at a smaller rate. Before the sheet coagulated, the sheet was cut to a length of 180 cm and was naturally cured to provide hardened sheets. The weight decrease during the 10-15 day curing was found 29%.

EXAMPLE 4

An amount of 93 parts by weight of gypsum slag, 3 parts by weight of sepiolite, 2 parts by weight of reinforcing fibers, 0.5 parts by weight of curdlan, 1 part by weight of methyl cellulose, 0.5 parts by weight of polyethylene oxide and 5 parts by weight of pearlite were admixed together over about 20 minutes with a ribbon blender to provide a powder mixture.

The powder mixture was kneaded with 77 parts by weight of water and 5 parts by weight of aluminum sulfate for about 20 minutes with a screw kneader to provide a clay-water-like paste.

Using a pair of rolls having a clearance of 9 mm therebetween, the paste was roll-extruded in the same manner as in the Example 3, to provide a sheet of 30 cm in breadth and 9 mm in thickness. Before the sheet coagulated, it was cut to a length of about 180 cm. Ten sheets were placed one on the other, wrapped with a resin sheet and steam was blown into the sheets for 6 hours to cure the sheets at 105° C.

The resultant hardened sheets were found to have a strength of 170 kg/cm$^2$, nearly the same as a gypsum slag board produced by a usual paper making method.

EXAMPLE 5

An amount of 100 Kg of 6 parts by weight of sepiolite, 3 parts by weight of reinforcing fibers, 2 parts by weight of curdlan, 4 parts by weight of methyl cellulose, 4 parts by weight of polyethylene oxide, 800 parts by weight of cement and 100 parts by weight of 40-60 mesh pit sand were admixed together to prepare a power mixture.

Water was added to the powder mixture in an amount of 40 parts by weight in relation to 100 parts by weight of the cement, and the resultant mixture was kneaded together with a pug mill, to prepare a clay-water-like rod having a diameter of about 3 cm.

The paste was extruded continuously through a die provided with a ringwise opening having an outer diameter of 4.5 cm and an inner diameter of 4.0 cm to provide a tubular green mold. The green mold was cut to ten tubes each of 5 m long, and the tubes were cured at 105° C. for 6 hours in the same manner as in the Example 4, followed by standing for a day, whereby to provide hardened articles which retained their initial shape and which were not adhering to each other.

Thereafter, the mold were left standing for a week until the article had no water when it was found to have a specific gravity of 1.62, a length of 4.92 m and an outer diameter 4.45 cm.

EXAMPLE 6

A mixture of 20 Kg of 3 parts by weight of sepiolite, 6 parts by weight of reinforcing fibers, 0.2 parts by weight of curdlan, 0.4 parts by weight of methyl cellulose, 0.4 parts by weight of polyethylene oxide, 85 parts by weight of normal portland cement and 5 parts by weight of white mica was admixed together with a ribbon mixer to prepare a power mixture.

Water was added to the powder mixture in an amount of 40 parts by weight in relation to 85 parts by weight of the cement, and the resultant mixture was kneaded together for about 30 minutes with a kneader, to provide a paste. The paste was extruded continuously through pairs of rolls having a clearance therebetween of 2.5 mm, 3.0 mm, 3.5 mm, 4.0 mm, 5.0 mm and 6.0 mm, respectively, to produce continuous green sheets.

Before the sheets coagulated, each of the sheets was cut to four sheets each of 30 cm square, and each of the sheets was separately cured naturally over a period of 28 days. All the hardened articles were found not to curl and have a shrinkage rate of not more than 0.12%.

EXAMPLE 7

An amount of 3 parts by weight of sepiolite, 6 parts by weight of reinforcing fibers, 0.2 parts by weight of curdlan, 0.4 parts by weight of methyl cellulose, 0.4 parts by weight of polyethylene oxide and 90 parts by weight of normal portland cement were admixed together to prepare a power mixture.

An amount of 43 parts by weight of water was added to the powder mixture and the resultant mixture was kneaded together for about five minutes with a screw kneader, to provide a paste. The paste was extruded continuously through a pair of rolls having a clearance of 2.2 mm therebetween, to produce continuous green sheets having a breadth of 30 cm. The green sheet was found to semi-coagulate after half a day.

The green mold was cured naturally over a period of 28 days. The properties of the hardened article are as follows.
Specific gravity: 1.43
Water content: 4.4%
Water absorption: 20.1%
Flexural strength: 275 kg/cm$^2$
Charpy impact strength: 3.6 Kg/cm/cm$^2$
Change in length at 60° C.: 0.43%.

EXAMPLE 8

An amount of 2 parts by weight of pullulan, 30 parts by weight of reinforcing fibers, 4 parts by weight of methyl cellulose, 4 parts by weight of polyethylene oxide, 60 parts by weight of attapulgite and 900 parts by weight of normal portland cement were admixed together for about 30 minutes with a V-type blender, followed by kneading together with 430 parts by weight of water for about 15 minutes with a pug mill, to prepare a clay-water like paste.

The paste was extruded continuously through a pair of rolls to produce a continuous green sheet having a thickness of 4 mm. The green sheet was cured naturally over a period of seven days, thereby to provide a rigid sheet having surface glosss.

The sheet was then steam-cured at 105° C. for five hours in the same manner as hereinbefore described. The resultant hardened sheet article was found to retain surface gloss and have a flexural strength of 285 kg/cm$^2$ in the cross direction and 390 kg/cm$^2$ in the machine direction. The dimensional change was not more than 0.10% after 180 days.

Further, the above mentioned paste was manually extruded with an extruder provided with a die having an opening of 3 mm in diameter, thereby to produce a string having surface gloss. The string hardened without cracks either by natural cure or by steam cure at 105° C.

EXAMPLE 9

A mixture of 2 parts by weight of pullulan, 60 parts by weight of reinforcing fibers, 4 parts by weight of methyl cellulose, 4 parts by weight of polyethylene oxide, 30 parts by weight of sepiolite and 900 parts by weight of normal portland cement were admixed together for about 15 minutes with a V-type blender, followed by kneading together with 360 parts by weight of water with a pug mill, to prepare a clay-water like paste.

The paste was extruded with an extruder provided with a die having an opening of 5 mm in diameter, thereby to produce a green mold of string having flat surface and a length of more than one meter. The green mold hardened without cracks either by natural cure for 30 days or by steam cure at 105° C. for eight hours.

Further, the above mentioned paste was molded into a sheet of 4 mm thick, and was then naturally cured in the same manner as in the Example 7, thereby to provide a hardened material having surface gloss. It was found to have a flexural strength of 270 kg/cm$^2$ in the cross direction and 340 kg/cm$^2$ in the machine direction.

EXAMPLES 10–12

The polysaccharide, polyethylene oxide, methyl cellulose and sepiolite were admixed each in an amount as shown in the Table 1 in a first polyethylene envelope, while the polyvinyl alcohol fibers and portland cement were admixed together in an amount as shown in the Table 1 in a second polyethylene envelope.

The first and second mixtures were then mixed together with a home use mixer to unravel the polyvinyl alcohol fibers to filaments and to prepare a uniform mixture.

Water was added to the mixture and fully kneaded together to prepare a clay-water-like paste. The paste was roll-extruded to provide a continuous green sheet mold, and green string mold as well.

TABLE 1

| Hydralic Composition | Examples | | |
|---|---|---|---|
| (parts by weight) | 10 | 11 | 12 |
| Curdlan | 20 | 20 | — |
| XCD-Polymer | — | — | 20 |
| Polyethylene oxide | 4 | 4 | 4 |
| Methyl cellulose | 4 | 4 | 4 |
| Sepiolite | 60 | 60 | 60 |
| Polyvinyl alcohol fibers | 30 | 7 | 7 |
| Normal portland cement | 882 | 905 | 905 |
| Water | 416 | 406 | 428 |

EXAMPLE 13

This example is directed to the production of curdlan coagulable in the presence of calcium ions and its properties in the presence of calcium ions.

A 30% aqueous solution of sodium hydroxide was added to a fermentation broth of conventional *Alkaligenes faecalis var myxogenes* NTK-u (ATCC-21860) containing about 4% of curdlan to prepare a 0.4N sodium hydroxide solution. The solution was kneaded at 60° C. with a kneader to dissolve curdlan in the solution, followed by cooling to 25° C.

As a first method, the solution was added dropwise to methanol twice as much as the solution under stirring, to prepare a slurry containing sediment of glucan. A 30% hydrochloric acid solution was added to the slurry to adjust the slurry at a pH of 6.0, and then the slurry was centrifugally dehydrated. The centrifugally dehydrated glucan was made into a slurry again in fresh methanol and centrifuged to provide solvent-dehydrated glucan. The glucan was then dried at 60° C. for about three hours under a reduced pressure of 720 Torr, and then milled, to provide powdery curdlan.

As a second method, the above mentioned solution having the glucan dissolved therein was placed in a freezing room at −20° C. for about five hours to provide a frozen solution. The frozen solution was crushed and added to methanol twice as much as the solution under stirring, to prepare a slurry containing sediment of glucan. The slurry was then worked up in the same manner as in the first method, to provide powdery glucan.

The properties of each of curdlan prepared by the first and second method are shown in the Table 2.

TABLE 2

| | Method of Preparation | |
|---|---|---|
| | First | Second |
| Solid content of centrifuged glucan (%) | 20.2 | 30.0 |
| Solid content of solvent-dehydrated glucan (%) | 32.0 | 43.3 |
| Water content of powdery glucan (%) | 3.5 | 3.0 |
| Ash content of powerery glucan (%) | 2.1 | 1.5 |

TABLE 2-continued

|  | Method of Preparation | |
|---|---|---|
|  | First | Second |
| Properties of powdery glucan | | |
| pH of 1% aqueous dispersion | 6.6 | 7.1 |
| Swelled volume[1] of 1% aqueous dispersion | 5 | 6 |
| Formation of crosslinked gels in a cement filtrate[2] | Yes | Yes |
| Viscosity of a cement filtrate[3] (centipoise) | 360 | 180 |
| Heated gel strength (g/cm$^2$)[4] | 190 | 100 |

Notes:
[1] times as much as the initial volume.
[2] A filtrate of a mixture of 1000 g of cement and 800 g of water.
[3] 3 g of glucan was added to a filtrate of a mixture of 1000 g of cement and 800 g of water. Measured with a B-type viscometer.
[4] 0.2 g of glucan was dispersed in 10 ml of water, and heated at 100° C. for 10 minutes, followed by cooling.

EXAMPLE 14

This example is directed to the production of paramylon coagulable in the presence of calcium ions and its properties in the presence of calcium ions.

Three liters of Koren-Hutner medium (Koren, L. E. C., Hutner, S. H., Journal of Protozoology, 14, Supplement, 17, 1967) was placed in a five liter capacity fermenting jar and sterilized for 20 minutes at 121° C. The culture medium was inoculated with 150 ml of fermentation broth of *Euglena gracilis klebs* which had been precultivated in the same medium as above. The cultivation was carried out at 28° C. for 96 hours with stirring at 400 rpm and ventilation at one liter per minute in the dark. An amount of two liters of fermentation broth was obtained from two fermenting jars. The broth was found to contain 2% of bacteria in dry amount, and the dried bacteria was found to contain 20% of a glucan.

An amount of five liters of culture broth was centrifuged at 8000 rpm for 10 minutes to provide a wet bacterial paste. Water was added to the paste to a total volume of 500 ml and the bacteria was subjected to ultrasonic crushing to prepare a bacterial slurry. An aqueous solution of sodium hydroxide was added to the bacterial slurry to adjust the slurry at a concentration of 3N, and then the slurry was kneaded at 50° C. with a kneader to dissolve the bacteria in the alkaline solution.

In the same manner as in the second method in the Example 13, water was added to the alkaline solution to a total volume of 2500 ml, and the solution was frozen at −20° C. The frozen solution was crushed and added to methanol twice as much as the solution under stirring, to prepare a slurry containing sediment of glucan. A 35% hydrochloric acid solution was added to the slurry to adjust the slurry at a pH of 6.0, and then the slurry was centrifuged. The centrifuged glucan was made into a slurry again in fresh methanol and centrifuged to provide a solvent-dehydrated glucan. The glucan was then dried at 50° C. for about three hours under a reduced pressure of 720 Torr, and then milled to provide powdery paramylon.

As a further method, the above mentioned alkaline solution of the bacteria was worked up in the same manner as in the first method as set forth in the Example 13 to provide powdery paramylon.

The properties of each of paramylon prepared in the first and second method are shown in the Table 3.

TABLE 3

|  | Method of Preparation | |
|---|---|---|
|  | First | Second |
| Solid content of centrifuged glucan (%) | 15 | 25 |
| Solid content of solvent-dehydrated glucan (%) | 20 | 37 |
| Water content of powdery glucan (%) | 4 | 3.0 |
| Ash content of powerery glucan (%) | 3 | 1.0 |
| Properties of powdery glucan | | |
| pH of 1% aqueous dispersion | 6.2 | 6.5 |
| Swelled volume[1] of 1% aqueous dispersion | 4.8 | 5 |
| Formation of crosslinked gels in a cement filtrate[2] | Yes | Yes |
| Viscosity of a cement filtrate[3] (centipoise) | 120 | 150 |
| Heated gel strength (g/cm$^2$)[4] | <10 | <10 |

Notes:
[1] times as much as the initial volume.

What is claimed is:

1. A hydraulic inorganic composition comprising:
   a hydraulic inorganic powder;
   curdlan as a molding agent in an amount of 0.1 to 10 parts by weight in relation to 100 parts by weight of the hydraulic inorganic powder; and
   water in an amount effective to provide plasticity to said composition.

2. The composition as claimed in claim 1 wherein the inorganic hydraulic powder is a cement.

3. The composition as claimed in claim 1 wherein the cement is portland cement.

4. The composition as claimed in claim 1 which further contains a reinforcing fiber in an amount of up to and including 40% by weight based on the hydraulic inorganic powder.

5. The composition as claimed in claim 4 wherein the reinforcing fiber is polyvinyl alcohol fiber.

6. The composition as claimed in claim 1 which further contains a filler in an amount of up to and including 40% by weight based in the hydraulic inorganic powder.

7. The composition as claimed in claim 1 which further contains a coagulant.

8. The composition as claimed in claim 7 wherein the coagulant is polyethylene oxide.

9. The composition as claimed in claim 1 which further contains a second molding agent.

10. The composition as claimed in claim 9 wherein the second molding agent is methyl cellulose.

11. A hardened molded article which is produced by molding into a green mold an aqueous composition comprising a hydraulic inorganic powder, curdlan as a molding agent in an amount of 0.1 to 10 parts by weight in relation to 100 parts by weight of the hydraulic inorganic powder, and water in an amount effective to provide plasticity to said composition, and then curing the mold by hydration under normal pressure.

12. A method of producing a hardened molded article comprising:
   molding into a green mold an aqueous composition which comprises a hydraulic inorganic powder, curdlan as a molding agent in an amount of 0.1 to 10 parts by weight in relation to 100 parts by weight of the hydraulic inorganic powder, and water in an amount effective to provide plasticity to said composition; and
   curing the mold by hydration under normal pressure.

13. The method as claimed in claim 11 wherein the green mold is naturally cured.

14. The method as claimed in claim 12 wherein the green mold is steam-cured.

15. The method as claimed in claim 13 wherein the green mold is cured at a temperature of freezing point to 180° C.

* * * * *

UNITED STATES PATENT AND TRADEMARK OFFICE
CERTIFICATE OF CORRECTION

PATENT NO. : 5,154,771

DATED : October 13, 1992

INVENTOR(S) : Takeo WADA et al.

It is certified that error appears in the above-identified patent and that said Letters Patent is hereby corrected as shown below.

Col. 1, line 17, correct the spelling of --asbestos--;

line 23, change "have" to --has--;

line 33, correct the spelling of --hydraulic--;

line 45, change "method" to --methods--;

line 55, delete "of" and insert --with--;

line 61, correct the spelling of --oligosaccharides--.

Col. 2, line 1, delete "in" and insert --from--;

line 9, correct the spelling of --European--;

line 37, before "high", insert --as-- and correct the spelling of --plasticity--.

Col. 3, line 12, delete "which" and insert --it has a--;

line 25, before "above", insert --stated--.

Col. 4, line 38, correct the spelling of --polyammonium--.

Col. 5, line 40, delete "one of what" and insert --a mineral which--;

line 42, change "powder" to --powdery--.

UNITED STATES PATENT AND TRADEMARK OFFICE
CERTIFICATE OF CORRECTION

PATENT NO. : 5,154,771

DATED : October 13, 1992

INVENTOR(S) : Takeo WADA et al.

It is certified that error appears in the above-identified patent and that said Letters Patent is hereby corrected as shown below:

Col. 7, line 32, change "28 day" to --28th day of--;

line 50, change "10-15" to --10th-15th--.

Col. 9, line 28, correct the spelling of --gloss--;

line 54, before "flat", insert --a--;

line 59, after "sheet", delete --of--.

Col. 10, line 15 (Table 1), correct the spelling of --Hydraulic--;

lines 31-32, correct the spelling of --Alcaligenes--.

Col. 11, line 38, delete "bacteria was", and insert --bacteria were--;

line 42, delete "bacteria was", and insert --bacteria were--.

Col. 12, Table 3 "Notes" should read --Notes: 1--.

--2) A filtrate of a mixture of 1000 g of cement and 800 g of water.

3) 3 g of glucan was added to a filtrate of a mixture of 1000 g of cement and 800 g of water.
Measured with a B-type viscometer.

4) 0.2 g of glucan was dispersed in 10 ml of water, and heated at 100°C for 10 minutes, followed by cooling.--

UNITED STATES PATENT AND TRADEMARK OFFICE
CERTIFICATE OF CORRECTION

PATENT NO. : 5,154,771
DATED : October 13, 1992
INVENTOR(S) : Takeo WADA et al.

It is certified that error appears in the above-identified patent and that said Letters Patent is hereby corrected as shown below:

Column 12, line 1, change "claim 1" to --claim 2--.

Column 12, line 3, change "in" to --on--.

Column 12, line 1, change "claim 11" to --claim 12--.

Column 12, line 1, change "claim 13" to --claim 12--.

Signed and Sealed this

Fifteenth Day of February, 1994

Attest:

BRUCE LEHMAN

Attesting Officer    Commissioner of Patents and Trademarks